United States Patent
Lakshmanan et al.

(10) Patent No.: US 8,505,038 B2
(45) Date of Patent: Aug. 6, 2013

(54) METHOD AND SYSTEM FOR ENHANCING MS EXCHANGE (MAPI) END USER EXPERIENCES IN A SPLIT PROXY ENVIRONMENT

(75) Inventors: Meenakshi Sundaram Lakshmanan, Hayward, CA (US); Janis Gailis, Tiraine (LV); Marcin Lizon, Waterloo (CA); Adrian Rogobete, Waterloo (CA); Matthew Paul Thurston, Guelph (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 1141 days.

(21) Appl. No.: 12/020,954

(22) Filed: Jan. 28, 2008

(65) Prior Publication Data

US 2009/0193443 A1  Jul. 30, 2009

(51) Int. Cl.
*G06F 3/00* (2006.01)
*G06F 15/16* (2006.01)

(52) U.S. Cl.
USPC ........... 719/330; 719/313; 719/314; 719/328; 709/203

(58) Field of Classification Search
None
See application file for complete search history.

(56) References Cited

U.S. PATENT DOCUMENTS

| | | | | |
|---|---|---|---|---|
| 5,923,846 A * | 7/1999 | Gage et al. | | 719/313 |
| 6,510,550 B1 * | 1/2003 | Hightower et al. | | 719/314 |
| 7,493,592 B2 * | 2/2009 | Karatal et al. | | 719/328 |
| 7,702,739 B1 * | 4/2010 | Cheng et al. | | 709/203 |
| 7,716,492 B1 * | 5/2010 | Saulpaugh et al. | | 719/313 |
| 7,890,957 B2 * | 2/2011 | Campbell | | 719/313 |
| 7,996,855 B2 * | 8/2011 | Heist et al. | | 719/330 |
| 2002/0052968 A1 * | 5/2002 | Bonefas et al. | | 709/231 |
| 2003/0061292 A1 * | 3/2003 | Underseth et al. | | 719/330 |
| 2003/0097459 A1 * | 5/2003 | Baskey et al. | | 709/231 |
| 2003/0177194 A1 * | 9/2003 | Crocker et al. | | 709/203 |
| 2003/0217166 A1 * | 11/2003 | Dal Canto et al. | | 709/229 |
| 2003/0225889 A1 * | 12/2003 | Moutafov | | 709/227 |
| 2005/0021667 A1 * | 1/2005 | Conway-Jones et al. | | 709/217 |
| 2005/0080930 A1 * | 4/2005 | Joseph | | 709/248 |
| 2006/0129650 A1 * | 6/2006 | Ho et al. | | 709/207 |
| 2006/0184667 A1 * | 8/2006 | Clubb et al. | | 709/224 |
| 2006/0200522 A1 * | 9/2006 | Guest | | 709/206 |
| 2007/0094337 A1 * | 4/2007 | Klassen et al. | | 709/206 |
| 2007/0174428 A1 * | 7/2007 | Lev Ran et al. | | 709/203 |
| 2007/0245090 A1 * | 10/2007 | King et al. | | 711/129 |
| 2009/0157836 A1 * | 6/2009 | Maffeis | | 719/328 |

OTHER PUBLICATIONS

"IEEE Potentials", 1999, pp. 1-4.*
"Split-Proxy Concept for Application Layer Handover in Mobile Communication Systems", Jens Kammann, 2002, pp. 1-5.*
"A Middleware Framework for Delivering Business Solutions", 2001, pp. 1-60.*
"A general purpose proxy filtering mechanism applied to the mobile environment", Zenel, 1999, pp. 1-19.*

* cited by examiner

Primary Examiner — Tuan Dao
(74) Attorney, Agent, or Firm — Tarek N. Fahmi, APC

(57) ABSTRACT

A split proxy is configured for managing asynchronous MAPI communications between a client and a server by establishing a queuing structure for MAPI messages that make up the communications. The MAPI messages are subsequently exchanged between the client and the server using the queuing structure. Multiple remote procedure calls (RPCs) underlying the MAPI messages may be grouped together in batches for exchange between proxies of the split proxy. Also, when the client logs off from the server, a MAPI keep-alive process allows updates received at the server to be pre-populated to the split proxy for transfer to the client when it reestablishes a connection.

37 Claims, 7 Drawing Sheets

METHOD AND SYSTEM FOR ENHANCING MS EXCHANGE (MAPI) END USER EXPERIENCES IN A SPLIT PROXY ENVIRONMENT

FIELD OF THE INVENTION

The present invention relates to systems and methods for providing support for messaging application programming interface (MAPI) exchanges in a split proxy architecture.

BACKGROUND

MAPI, the messaging application programming interface, is a communication protocol that allows client programs to become (e-mail) messaging-enabled, -aware or -based, by calling subroutines that interface with messaging services. For example, MAPI allows a user to send e-mails from within an application such as a word processor (e.g., Microsoft Word™) and attach the document that the user is composing. Importantly, MAPI is the communication protocol used by the popular Microsoft Outlook™ client to communicate with Exchange™ servers to send and receive e-mails and other notifications (e.g., calendar updates, etc.) in enterprise networks. Here the term "client" is generally used to refer to a computer program that requests services and "server" is used to refer to the computer program that provides the requested services.

Microsoft regards the MAPI protocol (which is based on the Microsoft Remote Procedure Call (RPC)) used by Outlook/Exchange to be proprietary and does not release details of the protocol to third parties. Nevertheless, third parties have been able to examine communication exchanges between Outlook clients and Exchange servers in order to understand how these two entities communicate with one another. Such understanding has allowed third parties to provide support for MAPI messaging in proxies deployed between Outlook clients and Exchange servers, thus contributing to better overall user experiences in networks where such proxies are used.

A proxy (or proxy server, as it is sometimes called) is a form of computer-based device used to regulate traffic in computer networks. Generally, a proxy is a computer system and/or application program that resides logically between one or more clients and one or more content sources (e.g., servers), and which terminates connections between the clients and the content sources In response to a client request, for example for a specified service, file, connection, web page, or other resource, the proxy provides the requested content directly (e.g., if it stores a local copy of same) or connects to the specified server and makes the request on behalf of the client. In this latter case, the proxy may retain a copy of the requested content so as to service later requests for that content directly, without having to connect to the server. Proxies may also be used to filter network traffic based on various criteria.

One relatively recent use of proxies is in application delivery networks (ADNs). ADNs have become common in large enterprises where there is a need to deliver business applications to remote users and/or branch offices. ADNs typically embody layers of caching, compression, traffic shaping, quality of service management, and application-specific processes to optimize content delivery between clients and servers. The goal of the ADN is to accelerate delivery of content to the resources where it will be used or consumed.

To provide for this acceleration within an ADN (or other network), a split proxy configuration may be used. A split proxy is essentially a pair of proxies installed across two computer-based systems. Since they are effectively two parts of the same program, they can communicate with each other in a more efficient way than can conventional clients and content sources. For example, individual nodes of a split proxy can communicate efficiently with one another through the use of byte caching.

Byte caching (or dictionary compression as it is sometimes called) eliminates the repeated transmission of sequences of bytes sent over computer-to-computer connections. The goal of byte caching is to recognize and eliminate repeated sequences within the communication stream between the two computer systems. That is, instead of transmitting the repeated sequences, an indicator or tag can be used instead. So long as the indicator or tag is smaller than the original data sequence, bandwidth is saved by transmitting only the indicator. Such an exchange may take place over a byte cache tunnel between two ends of a split proxy.

FIG. 1 illustrates a communication system that includes a split proxy 103. Split proxy 103 is connected to client computers 105, 107, and 109 via a first network 113, e.g., an intranet, and includes a first proxy 115 and a second proxy 117 located on different computer platforms. Split proxy 103 intercepts communication between client computers 105, 107, and 109, and a second network 111, e.g., the Internet. Thus, if server 101 (which is communicatively coupled to network 111) attempts communication with any of client computers 105, 107, and/or 109, that communication must go through split proxy 103. Likewise, if any of client computers 105, 107, and 109 attempts communication outside of network 113, that communication must also go through split proxy 103. The communication link between the first and second proxies 115 and 117 may be a high latency link and the two proxies may collaborate (e.g., using byte caching) to reduce application latency induced by this link.

The assignee of the present invention has previously provided split proxy support for MAPI. This so-called MAPI proxy intercepts and accelerates MAPI communications between Outlook clients and Exchange servers. To facilitate this, the MAPI proxy intercepts requests by Outlook clients for Exchange services. The MAPI proxy then looks up the request in a local database, and, if there is a match, replies to the Outlook client with the port number the requested service is listening on. As used herein, the term "port" refers to a logical connection point for a client application to communicate with a server application. Applications are said to "listen" to ports when they are configured to receive service requests on the specified logical connection points.

If the request from the Outlook client is not in the MAPI proxy's database, the MAPI proxy forwards the request to the Exchange server, which responds with the port number that the requested service is listening on. The MAPI proxy populates its internal database with this information, creates a listener on that port and responds to the Outlook client with the port number.

Thereafter, when the Outlook client connects to the requested service, the MAPI proxy intercepts the request and tunnels it between the split proxy pair (e.g., proxies 115 and 117 in FIG. 1). Substantial performance increases can be realized because the local proxy device (i.e., the one located close to the Outlook client) caches server information, negating the requirement to connect to an upstream server for repeated requests. Further, the local proxy compresses the Outlook traffic and sends it over the tunnel connection to the remote proxy (i.e., the one located nearer the Exchange server), which decompresses the data before sending it to the server.

While this legacy MAPI proxy works well for older version of the MAPI protocol, recent changes to the MAPI protocol demand that new approaches be adopted in order to support MAPI-based communications between clients and servers.

SUMMARY OF THE INVENTION

In one embodiment of the present invention, a split proxy is configured for managing asynchronous MAPI communications between a client and a server by establishing a queuing structure for messages that make up the communications. The messages are subsequently exchanged between the client and the server using the queuing structure. Multiple remote procedure calls (RPCs) underlying the MAPI communications may be grouped together in batches for exchange between proxies of the split proxy. Also, when the client logs off from the server, a MAPI keep-alive process allows updates received at the server to be pre-populated to the split proxy for transfer to the client when it reestablishes a connection.

BRIEF DESCRIPTION OF THE DRAWINGS

The present invention is illustrated by way of example, and not limitation, in the figures of the accompanying drawings in which.

DETAILED DESCRIPTION

Figure 1:
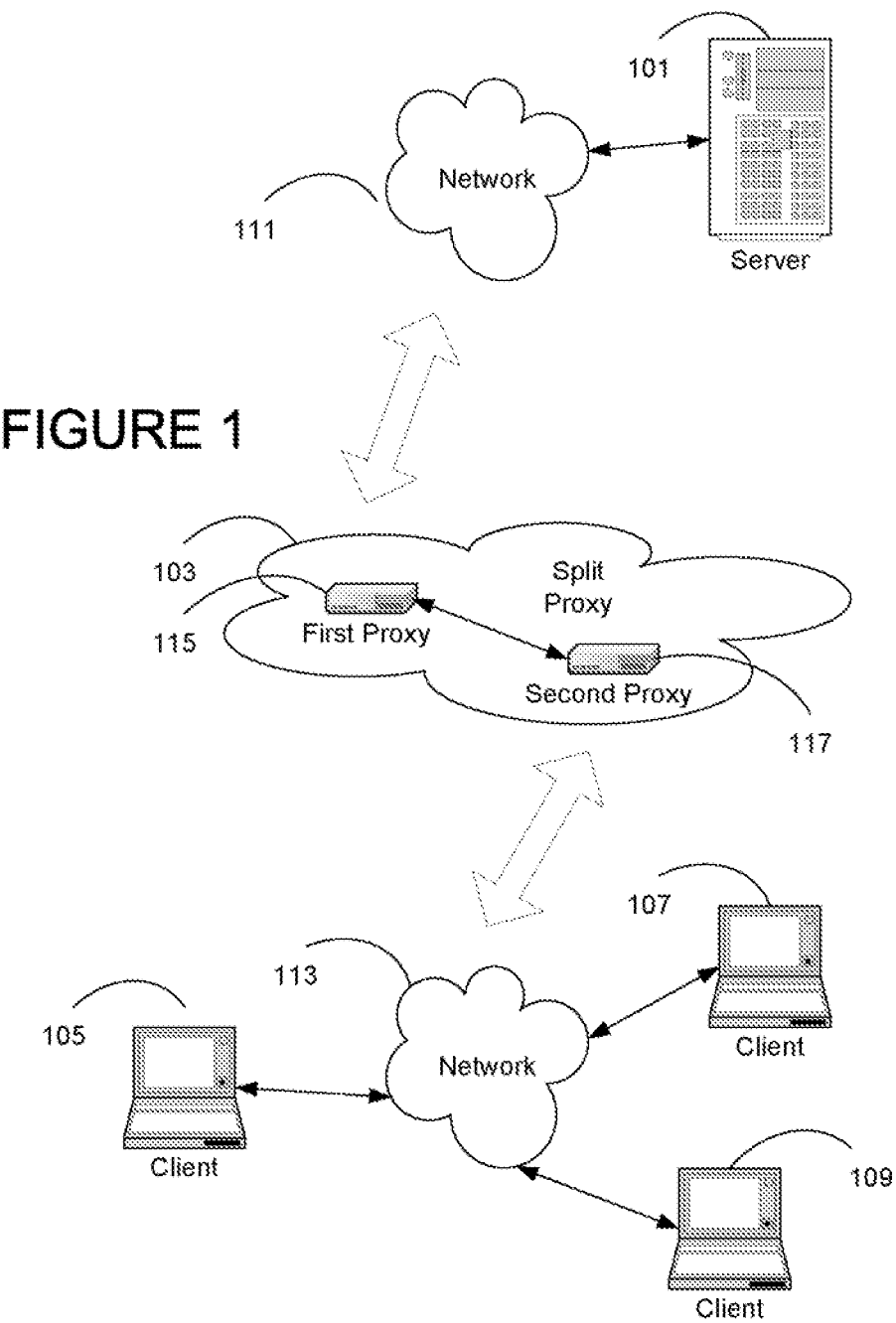
FIG. 1 illustrates a split proxy deployed between one or more clients and a server in accordance with an embodiment of the present invention.

Described herein are systems and methods for providing support for MAPI exchanges in a split proxy architecture. For example, the present MAPI proxy supports asynchronous MAPI communications between clients and servers. In addition, the present MAPI proxy employs batching in order to accelerate client-server communications and utilizes a "keep-alive" feature that allows the proxy to maintain a connection to the server even after a client has disconnected from the system. This helps to reduce the number of bytes retrieved from the server than would otherwise be the case if an Outlook client had to pick up mail from the server each time it reconnected to a network.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "creates", "initializes", "ties", "binds", "opens", "processing", "computing", "calculating", "determining", "displaying" or the like, refer to the action and processes of a computer system, or similar electronic computing device, that manipulates and transforms data represented as physical (electronic) quantities within the computer system's registers and memories into other data, similarly represented as physical quantities within the computer system memories or registers or other such information storage, transmission or display devices.

One embodiment of the present invention is instantiated in computer software, that is, computer readable instructions, which, when executed by one or more computer processors/systems, instruct, the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Figure 2:
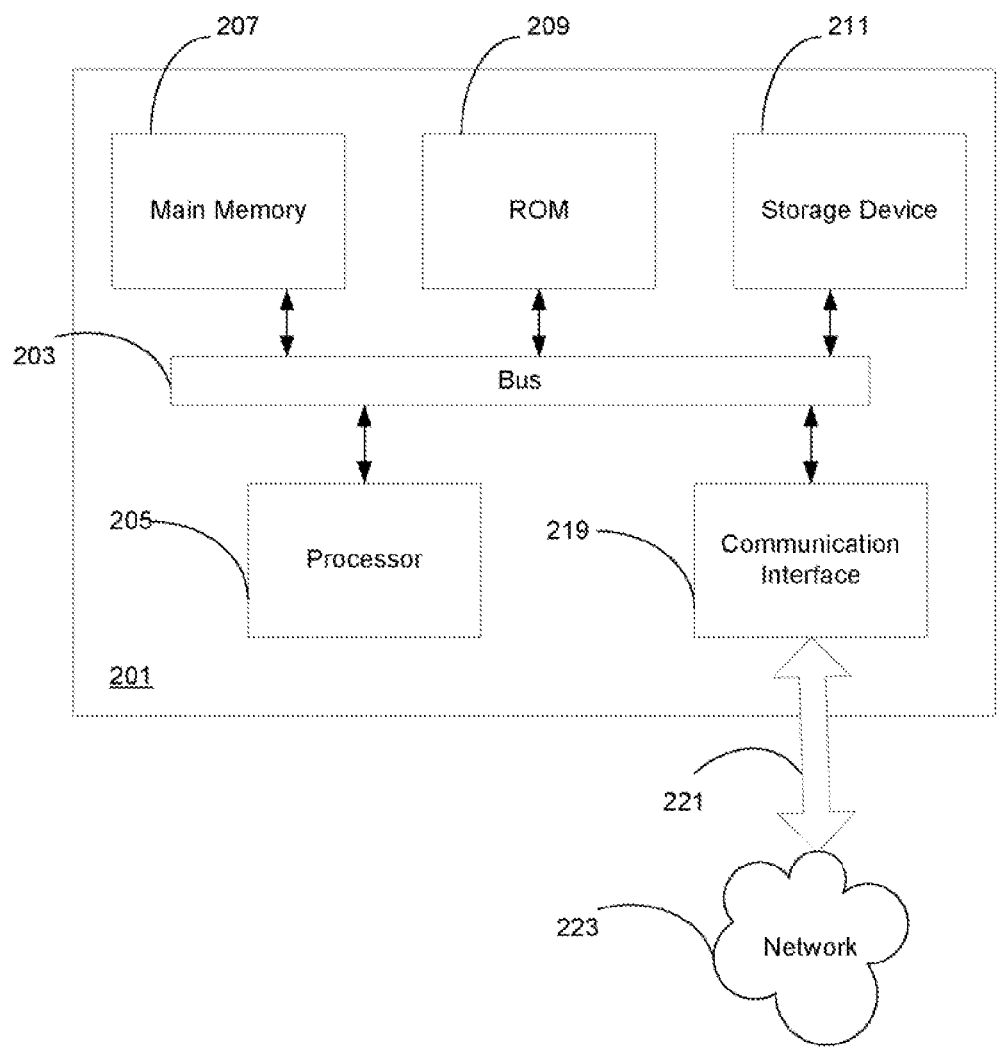
FIG. 2 illustrates a computer system configurable as a proxy in accordance with an embodiment of the present invention.

FIG. 2 is a diagram of a computer system that can be configured as a proxy consistent with an embodiment of the present invention. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment of the present invention, processor 205 executes one or more sequences of one or more instructions contained in main memory 207. Such instructions may be read into main memory 207 from another computer-readable medium, such as storage device 211. Execution of the sequences of instructions contained in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the interfaces and protocols of the present system may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented hi any such implementation, communication interface 219 sends and receives electrical, electromagnetic or optical signals that carry digital data streams representing various types of information.

In accordance with the present invention, MAPI communication processing is employed across the co-operating nodes of a split proxy, such as split proxy 103 in FIG. 1. For convenience, the proxy closest to the server (proxy 115 in FIG. 1) will be referred to as the concentrator and the proxy closest to the Outlook client (proxy 117 in FIG. 1) will be referred to as the branch proxy. In some embodiments these roles are arbitrary for the distinction between a client and a server may depend on which application is requesting services from another at a particular time.

For purposes of discussion herein, the separate nodes of the split proxy 103 will be discussed as being instantiated on separate computer systems, however, it should be recognized that the nodes may be instantiated as programs executing on a client and/or a server platform. For example, one of the nodes of the split proxy may be included as part of a client browser application, while the second node is a separate computer system deployed between the client and server. In other cases, one of the nodes of the split proxy may be instantiated as a program executing on the server, while the second node is a stand alone computer system deployed between the server and a client. In still further cases, both nodes of the split proxy may be deployed on separate, stand-alone computer systems deployed between the client and the server. While in other embodiments, one node of the split proxy may be instantiated as a program executing on the client, with the other node instantiated as a program executing on the server. The exact physical configuration and instantiation of the co-operating nodes of the split proxy is not critical to the present invention.

As alluded to above, MAPI relies on underlying remote procedure calls (RPCs) between clients and servers. Such RPCs are common where one application requests a service from another application and, generally speaking, in such an architecture any requesting program may be viewed as a client and any providing service as a server. RPCs allow a client application to request and thereby cause a server application to execute an action without the requirement of explicit instructions being provided.

In the context of a split proxy, the Outlook client sends an RPC request, which the branch proxy intercepts. The branch proxy then sends the request to the concentrator, which transmits the request to the Exchange server. In reply, the Exchange server sends an RPC response, which concentrator intercepts and sends to the branch proxy. The branch proxy then sends the RPC response to the client.

In legacy versions of MAPI, the underlying RPCs were synchronous in nature. That is, a MAPI client would make a request and wait until the MAPI server fulfilled that request before the MAPI client issued another request. Legacy MAPI proxies supported this regime by switching listening sockets from client to server and back again as each request or response was processed. A socket is a software object that connects an application to a network or communication protocol.

Newer versions of MAPI, however, permit asynchronous communication between the client and the server. Thus, a client may issue multiple requests to a server before receiving any responses to same. Stated differently, a client may have more than one request pending at a time. A MAPI proxy configured for processing synchronous MAPI RPCs will not support such communications and, indeed, may break a connection between a client and a server (e.g., by missing RPC requests made by a client or responses returned by a server).

To prevent this sort of communication failure, the present invention provides a MAPI proxy architected to provide support for asynchronous MAPI communications. In particular, the present MAPI proxy is configured to permit queuing of requests and responses at the branch proxy and the concentrator. For example, requests may be queued up at the concentrator prior to transfer to the Exchange server and responses may be queued up at the branch proxy before being transferred to the Outlook client.

Between the branch proxy and the concentrator, efficiencies may be achieved by encapsulating the various RPC messages (requests and/or responses) within other message structures. For convenience, these encapsulating messages will be referred to as CEEP messages (for core-to-edge encapsulation protocol). The exact format of these CEEP messages is not critical to the present invention (indeed, the use thereof is optional), and the pay load of the CEEP messages may be either RPC packets from the Outlook client to the Exchange server or fabricated pay loads used in connection with a keep-alive feature (discussed below).

To facilitate the message queuing at the branch proxy and the concentrator, a unique identifier, called a call_id, for each RPC message and its corresponding CEEP message is used. In this way, every RPC response may be ultimately associated back to its respective RPC request. Thus, the present MAPI proxy allows for asynchronous message exchanges between the client and the server.

Figure 3:
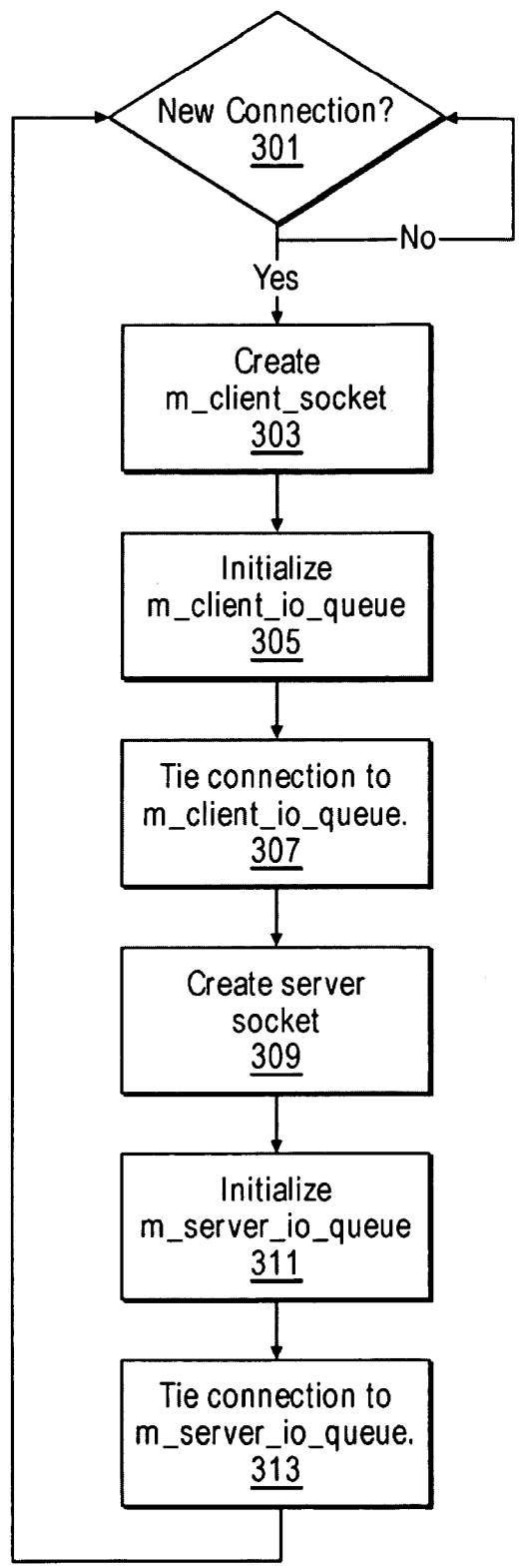
FIG. 3 illustrates a process for creating asynchronous communication queues for supporting asynchronous MAPI communications at a proxy in accordance with an embodiment of the present invention.

Referring now to FIG. 3, in one embodiment of the invention, upon detecting a new communication (e.g., a MAPI request issued by an Outlook client) 301, the MAPI proxy creates appropriate client and server sockets (m_client_socket and m_server_socket, respectively) and related input/output (I/O) queues (m_client_io_queue and m_server_io_queue) at each proxy of the split proxy pair. At the branch proxy, the client socket is used to communicate with the Outlook client; RPC protocol packets are sent and received on this socket. The server socket at the branch proxy is used to communicate with the concentrator using CEEP messages. At the concentrator, the client socket is used to communicate with the branch proxy (using CEEP messages), while the server socket is used to communicate with the Exchange server (using RPC protocol packets).

FIG. 3 illustrates one example of a process for instantiating the respective client and server sockets at the proxies (this procedure may be performed at each of the branch proxy and the concentrator). Upon detecting the communication (301), a client socket (m_client_socket) is created (303) for the connection, and an asynchronous queue (m_client_io_enqueue) is initialized (305) on that socket. The connection is then tied with this queue (307). Because the connection also needs a server socket to support the asynchronous nature of the communications, a new server socket (m_server_socket) is created (309) and initialized (311) it with its own asynchronous queue (m_server_io_queue). The connection is then tied with this queue as well (313). Thus, the connection now has access to both client and server queues, both of which are set to listen for data from the client and/or server at the same time, and the MAPI proxy can manage the arrival of asynchronous MAPI requests/responses from the client/server.

In some embodiments, the present MAPI proxy may employ batching in order to accelerate client-server communications. Because, MAPI is based on RPC messages that are transferred in blocks of data, performance issues arise when e-mail clients and servers are located at opposite ends of a wide area network from one another. For example, in legacy synchronous-MAPI schemes, clients must stop and wait for each block of data to arrive from the server before requesting the next block. Even in asynchronous-MAPI schemes latency issues arise whenever subsequent calls depend on the results of previous calls.

The present MAPI proxy helps to reduce such latencies by reducing the number of RPCs sent across a network from a requesting client to a server. Also, the MAPI proxy predicts or reads ahead in order to try and determine what will be requested next and makes that request before it is actually sent by the client. Thus, the MAPI proxy begins sending acknowledgments to the server (e.g., using fabricated messages) before information is actually delivered to the Outlook client.

In addition to batching, the MAPI proxy utilizes a keep-alive feature that allows the proxy to maintain a connection to the Exchange server after the Outlook client has disconnected from the system. Using fabricated messages made to resemble those which would otherwise be sent by an Outlook client, the MAPI proxy periodically checks the Exchange server for new mail and stores it locally so that when the true Outlook client reestablishes a connection (e.g., when the associated user logs in), the number of retrieved bytes from the server is fewer than it otherwise would be if the Outlook client had to pick up mail from the time it disconnected.

To support these batching and keep alive functions then, and to reduce the traffic traveling across the network, the branch proxy is configured to fabricate responses as if it were the server in order to prompt the client to generate further requests, and the concentrator is configured to fabricate requests as if it were the client in order to prompt the server to generate additional responses. This requires a message queuing architecture (incorporating CEEP_Request_queues and CEEP_Response_queues) at both the branch proxy and the concentrator as well as careful tracking of the call_ids of RPC and CEEP messages. In one embodiment of the invention, RPCs are processed when they reach the head of an associated queue or at an earlier time according to the following logic.

Figure 4:
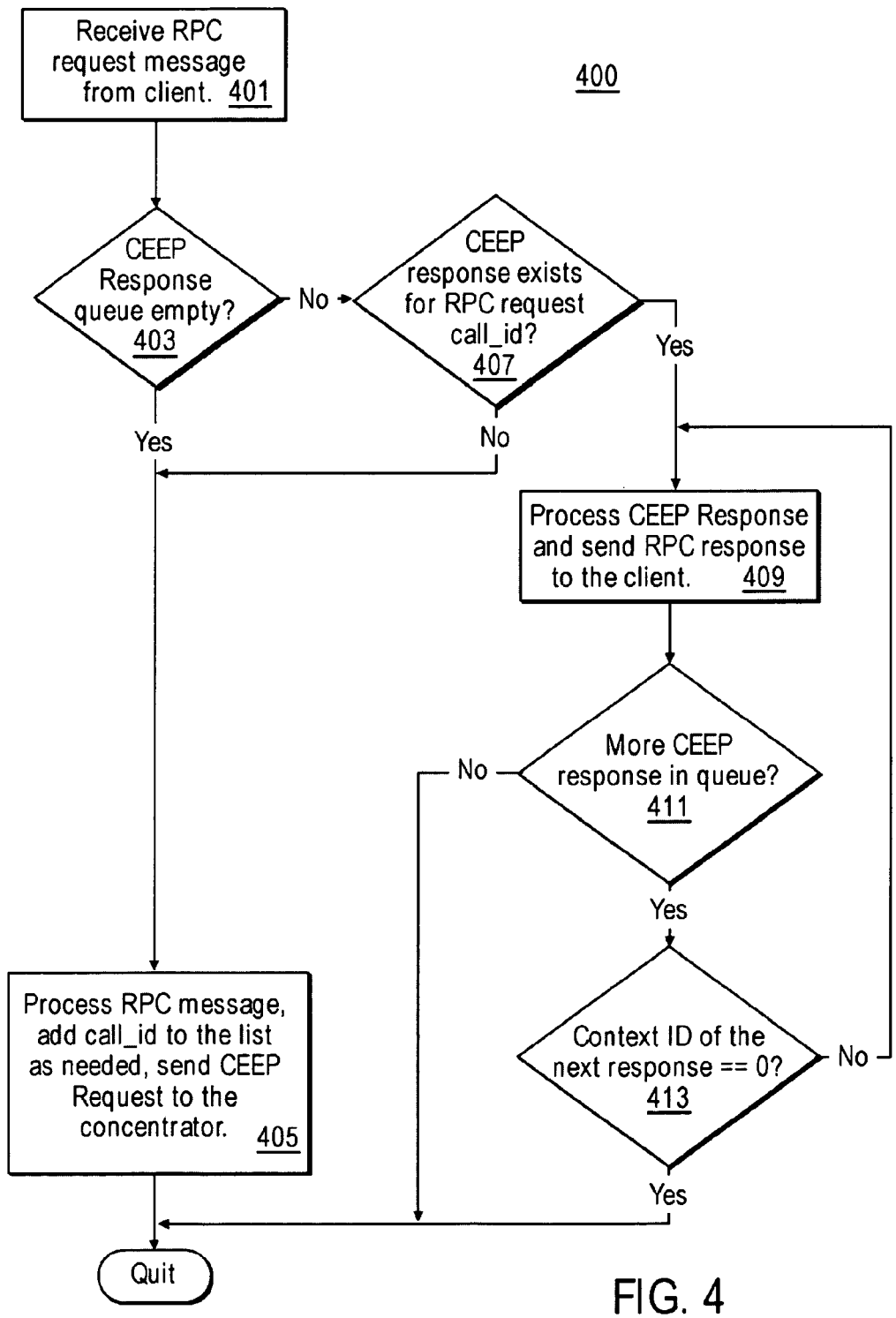
FIG. 4 illustrates a procedure for processing RPC requests received at one proxy of a split proxy pair in accordance with an embodiment of the present invention.

Referring to process 400 illustrated in FIG. 4, when an RPC request is received at the branch proxy from the Outlook client (401):

(1) if the CEEP_Response_queue at the branch proxy is empty (403), the RPC request is processed immediately (405) by adding its call_id identifier to a call_id list maintained by the branch proxy and sending a corresponding CEEP request to the concentrator.

(2) if, on the other hand, the CEEP_Response_queue is not empty (403), then (a) if a matching CEEP response for the RPC request is available in the CEEP_Response_queue (determined using the call_id list) (407), that matching CEEP response is processed and a corresponding RPC response is sent to the client (409). Successive RPC responses corresponding to existing CEEP responses in the CEEP_Response_queue may also be sent (411) until the Context parameter of a queued CEEP response indicates that it should not be so sent (Context=0) (413) or the queue is empty. The Context parameter is a context identifier used in RPC protocol headers and is set when an RPC client (in this case an Outlook MAPI client) binds to a particular RPC service offered by the Exchange server.

(b) if no matching CEEP response exists in the CEEP_Response_queue (407), the RPC request is processed by adding its call_id to the call_id list at the branch proxy and sending a corresponding CEEP request to the concentrator (405).

Figure 5:
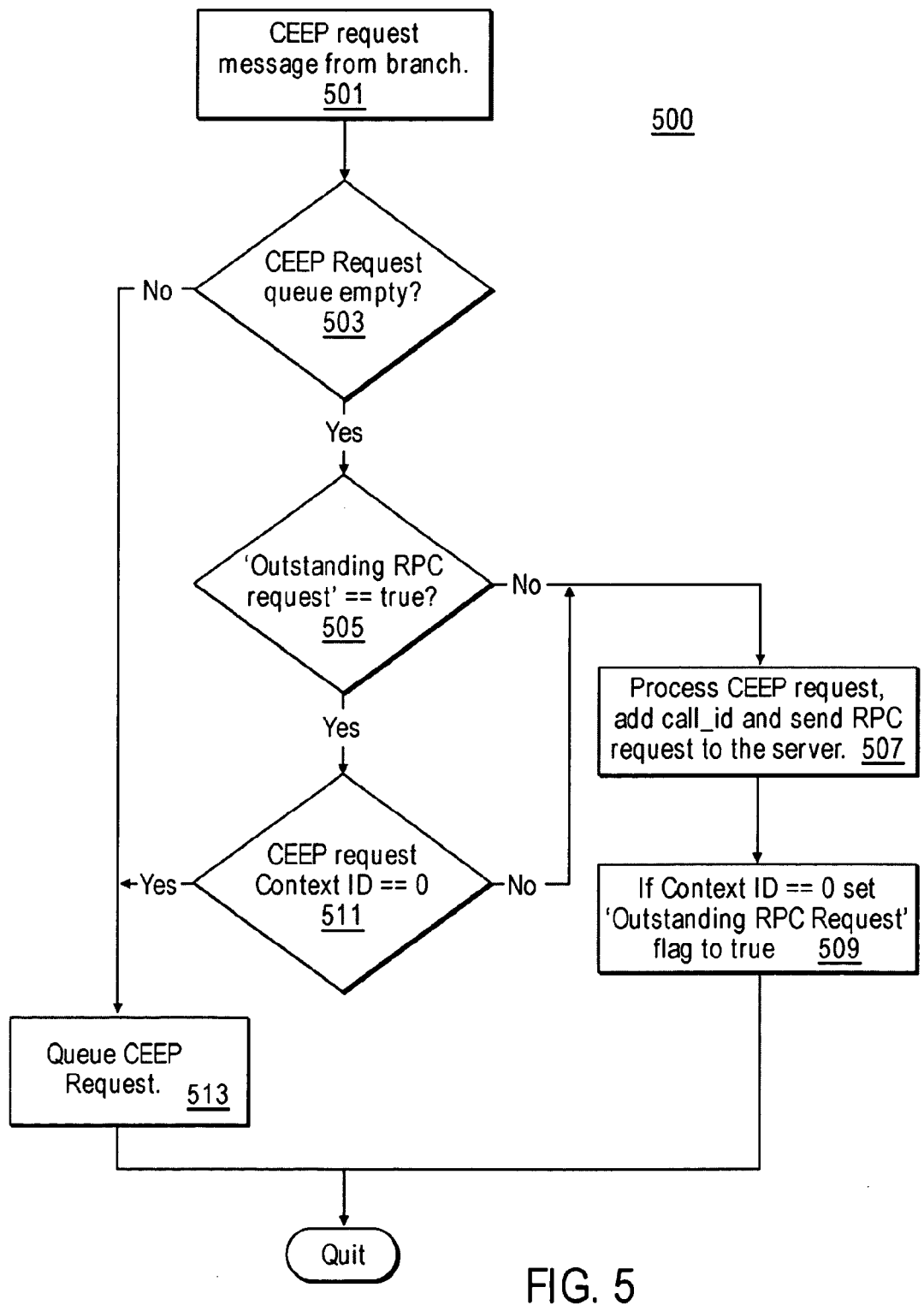
FIG. 5 illustrates a procedure for processing messages exchanged between proxies of a split proxy pair and conveying RPC requests between a client and a server in accordance with an embodiment of the present invention.

Referring now to process 500 illustrated in FIG. 5, when a CEEP request (which may, in the context of a keep-alive session, be a fabricated message, or otherwise will correspond to an RPC request sent by the Outlook client) is received from the branch proxy at the concentrator (501):

(1) If the concentrator's CEEP_Request_queue is empty (503), (a) if there are no outstanding RPC requests (e.g., as indicated by the absence of a flag showing such an outstanding request) (505), the new CEEP request is processed immediately (507) by adding its call_id parameter from the message to a call_id list at the concentrator, and sending a corresponding RPC request to the server. Afterwards (509), if the received CEEP message has Context=0, a flag is set to indicate the presence of an outstanding RPC request.

(b) if there is an outstanding RPC request (e.g., as indicated by a flag showing such an outstanding request) (505), the new CEEP request is either (511) added to the end of the CEEP_Request_queue (if Context=0) and subsequently processed in order when it reaches the head of the message queue (513), or processed immediately (507) as indicated above (in which case its call_id identifier is added to the call_id list, a corresponding RPC request is sent to the server (507), and if the received CEEP message has Context=0 (509), a flag is set to indicate the presence of an outstanding RPC request).

(2) If the CEEP_Request_queue is not empty (503), the new CEEP request is added to the tail of the CEEP_request_queue (513) and processed when it reaches the head of the queue.

Figure 6:
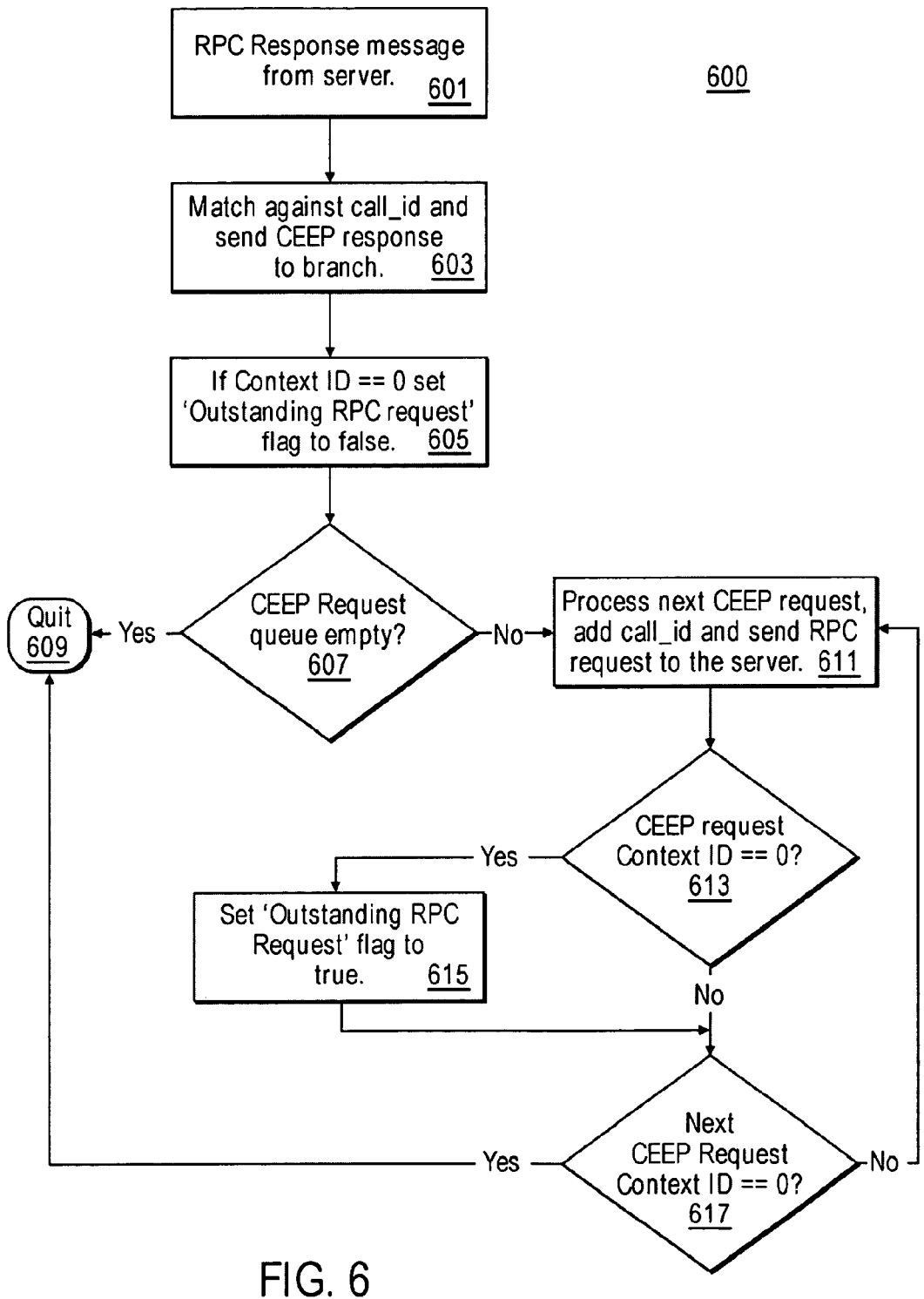
FIG. 6 illustrates a procedure for processing RPC responses received at one proxy of a split proxy pair in accordance with an embodiment of the present invention.

Referring to process 600 shown in FIG. 6, when an RPC response from the server is received at the concentrator (601), (1) the call_id of the incoming RPC response is matched with that of its corresponding CEEP request from the concentrator's call_id list (603) and a CEEP response is sent to the branch proxy;

(2) if the Context=0, the outstanding RPC request flag at the concentrator is cleared (605); and (3) if the CEEP_Request_queue at the concentrator is empty (607), the process quits (609); otherwise, the next CEEP request at the head of the queue is processed (611) by having its call_id added to the call_id list and a corresponding RPC request is sent to the server. Depending on the Context parameter of that CEEP request (613), the outstanding RPC request flag may be set (Context=0) (615) or not. If the next CEEP request in the queue has Context=0 (617), the process quits (609); otherwise, it is processed in the same fashion described above from step 611.

Figure 7:
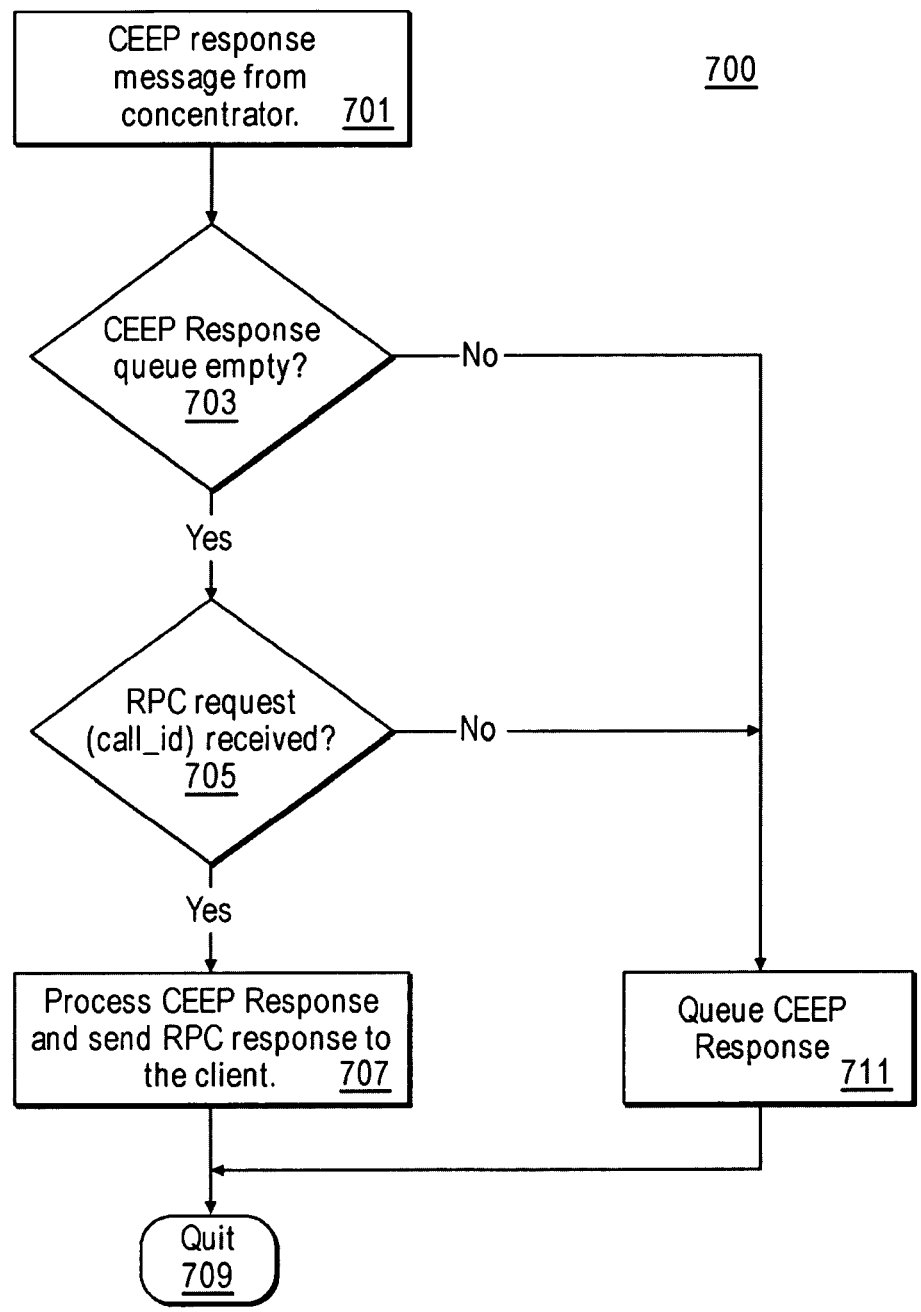
FIG. 7 illustrates a procedure for processing messages exchanged between proxies of a split proxy pair and conveying RPC responses between a client and a server in accordance with an embodiment of the present invention.

Referring to process 700 shown in FIG. 7, at the branch proxy, when a CEEP response is received from the concentrator (701):

(1) if the CEEP_Response_queue is empty (703),
   (a) if a matching call_id of an RPC request exists in the branch proxy's call_id list (705), the new CEEP response is processed immediately (707), with a corresponding RPC response being sent to the Outlook client, and the process then quits (709),
   (b) otherwise, if there is no matching RPC request call_id in the call_id list (705), the new CEEP response is added to the end of the CEEP_Request_queue (711) and processed when a corresponding RPC request is received (see FIG. 4).

(2) if the CEEP_request_queue is not empty (703), the new CEEP response is queued up at the end of the CEEP_Response_queue (711) and processed when a corresponding RPC request is received.

It is important to note that, although MAPI connections make use of underlying RPCs, a MAPI connection is not synonymous with an RPC connection. Instead, each MAPI connection may utilize more than one RPC connection to communicate during its lifetime and may even use multiple RPC connections at the same time in asynchronous fashion. Thus, in accordance with embodiments of the present invention, creation and use of the various message queues described above takes place within the context of a MAPI proxy user session. The use of such a user session accounts for the fact that RPC connections are merely commodities that may be utilized by one or more MAPI connections.

The present MAPI proxy is configured to identify and group, within the context of a MAPI proxy user session, a set of MAPI connections that belong to a single Outlook client application executing on a user's computer system. New MAPI proxy user sessions are detected and created at the point at which the MAPI proxy detects Outlook message sequences. Where available, the MAPI proxy user session may utilize identifiers that associate the MAPI connection with an actual user. But even where this information is not available (e.g., if the MAPI proxy did not observe the initiation of the Outlook client-to-Exchange server initial connection), the MAPI proxy can use other identifiers to track the state of a particular Outlook sessions across multiple RPC connections.

The use of a MAPI proxy user session also facilitates the implementation of the keep-alive feature. When an Outlook client logs off from the Exchange server this event is detected, and the MAPI proxy keeps a single connection to the server open to pre-populate the user's mailbox at the proxy. Upon return, when the user logs in his/her Outlook client, that client is populated from the MAPI proxy rather than having to connect to the Exchange server.

A MAPI connection may be identified by the MAPI proxy using MAPI policy handles (i.e., MAPI connection unique identifiers). These policy handles apply across different RPCs. In the case where the MAPI proxy is able to identify a new Outlook client logging to the Exchange server, the MAPI proxy is able to establish a "user-aware" MAPI proxy user session. That is, a session which uses a MAPI user DN (i.e., a string of characters representing a user domain name in a MAPI system, e.g., /O=xxxxMAIL/ou=First administrative Group/cn=Reciptents/cn=UserName) as a primary key. This session keeps state of all the RPC connections that are tied to this particular Outlook client (e.g., using the call_id parameter discussed above).

In other cases, the MAPI proxy must deal with an Outlook client that has been running for some time. In these instances, the MAPI proxy may have no prior knowledge about the traffic associated with that particular client. That is, the MAPI proxy may not be user-aware. In such cases, the MAPI proxy uses a MAPI policy handle to track the various RPC connections associated with the session. Consequently, because RPC connections can be tracked for both types of MAPI user sessions, the batching feature may be utilized for both types of user sessions.

Alternatively, a client and server IP address pair could be used as a lookup-key for grouping all RPC connections belonging to a single user. However, this approach has limitations in some deployment scenarios. For example, it may not work in networks where an IP address could be reused by another Outlook client once the original client logged off from the server and/or where an Outlook client acquires a different IP address each time it logs in to the server. In each case, the MAPI proxy user session would not be able to properly identify the Outlook client in order to deliver stored traffic after the client had logged out and then later logged back in.

In one embodiment, the MAPI keep-alive process is configured to periodically check with the server to determine whether a client associated with a given MAPI keep-alive session has received any new messages. In order to ensure that only new messages received by the server since the last check was made are retrieved, a unique message query is used by the MAPI proxy. This message query manipulates a time parameter in the query so that only messages received by the server since a specified time 'T' are returned. Parameter T is updated each keep-alive period, for example to specify the time of the last fetch. The result is that fetches during every keep-alive event retrieve only the set of messages that have been received within the time between keep-alive events at the client's mailbox on the server. In order to achieve full benefit of this approach, it is useful if the MAPI proxy and the Exchange server have their clocks synchronized, but even if this is not the case so long as parameter T is selected so that no gaps in time occur, there should not be any missed messages.

Thus, methods and systems have been described. Although discussed with reference to several illustrated embodiments, the present invention should not be limited thereby. Instead, the invention should only be measured in terms of the claims, which follow.

What is claimed is:

1. A method, comprising:
   creating, at each proxy of a split proxy pair which employs byte caching at each of the proxies, message queues for messages exchanged between each of the proxies in support of messaging application programming interface (MAPI) communications between a client and a server;
   setting sockets associated with each queue to listen for asynchronous communications between the client and the server;

while the client is logged off from the server, fabricating, at one or more of the proxies that comprise the split proxy, one or more MAPI messages to the server to provoke responses from the server, wherein the one or more MAPI messages resemble messages which would otherwise be sent by the client if the client were logged on; and receiving, at a first one of the message queues at a first one of the proxies of the split proxy pair, a message associated with a remote procedure call (RPC) from the client to the server and processing the message associated with the RPC according to whether or not the first message queue is empty.

2. The method of claim 1, wherein if the first message queue is empty, then processing the message associated with the RPC immediately and transmitting a corresponding message from the first proxy to a second one of the proxies of the split proxy pair.

3. The method of claim 2, further comprising receiving, at the first proxy and from the second proxy, a message responsive to the message corresponding to the message associated with the RPC, and, upon confirming said correspondence, transmitting a message response to the message associated with the RPC from the first proxy to the client.

4. The method of claim 1, wherein if the first message queue is not empty, then determining if the message associated with the RPC has an existing response stored at the first proxy and, if so, transmitting the response from the first proxy to the client.

5. The method of claim 1, wherein if the first message queue is not empty, then determining if the message associated with the RPC has an existing response stored at the first proxy and, if not, adding the message associated with the RPC to the first message queue and transmitting a corresponding message from the first proxy to a second one of the proxies of the split proxy pair.

6. The method of claim 1, further comprising, receiving, at a second one of the message queues at a second one of the proxies of the split proxy pair, a message associated with a remote procedure call (RPC) from the client to the server and processing the message according to whether or not an identifier in the message corresponds to an identifier of a previously stored message maintained by the second proxy.

7. The method of claim 6, wherein if the identifier in the message corresponds to the identifier of the previously stored message maintained by the first proxy, then transmitting an RPC response corresponding to the previously stored message to the client.

8. The method of claim 6, wherein if the identifier in the message does not correspond to any identifiers of previously stored messages maintained by the first proxy, then processing the message associated with the RPC immediately and transmitting a corresponding message from the first proxy to the second one of the proxies of the split proxy pair.

9. The method of claim 1, wherein if the first queue is not empty, then queuing the message associated with the RPC at the first proxy.

10. The method of claim 1, wherein if the first queue is empty, then either queuing the message associated with the RPC at the first proxy or transmitting a corresponding RPC request to the server from the first proxy, depending on whether or not another RPC request is identified as being outstanding.

11. The method of claim 1, wherein if the first queue is empty, and an RPC request is presently outstanding from the first proxy, then either queuing the message associated with the RPC at the first proxy or transmitting a corresponding RPC request to the server from the first proxy depending on a status of a context parameter of the message associated with the RPC.

12. The method of claim 1, wherein if the first queue is empty, queuing the message associated with the RPC at the first proxy.

13. The method of claim 1, wherein if the first queue is not empty, and a corresponding RPC request was earlier received at the first proxy, then transferring an RPC response corresponding to the message associated with the RPC from the first proxy to the server.

14. The method of claim 1, wherein if the first queue is not empty, but no corresponding RPC request was earlier received at the first proxy, then queuing the message associated with the RPC at the first proxy.

15. A method, comprising:
configuring a split proxy, which employs byte caching at each proxy of the split proxy, for managing messaging application programming interface (MAPI) communications between a client and a server by establishing a queuing structure for MAPI messages that make up said communications;

processing said MAPI messages exchanged between the client and the server using said queuing structure, wherein queues comprising said queuing structure are set to listen for messages arriving from clients and servers asynchronously; and while the client is logged off from the server, fabricating, at the split proxy, one or more MAPI messages to the server to provoke responses from the server, wherein the one or more MAPI messages resemble messages which would otherwise be sent by the client if the client were logged on; and receiving, at a first one of the queues at a first one of the proxies of the split proxy, a message associated with a remote procedure call (RPC) from the client to the server and processing the message associated with the RPC according to whether or not the first queue is empty.

16. The method of claim 15, wherein multiple remote procedure calls (RPCs) underlying said MAPI messages are grouped together for batch exchange between proxies of the split proxy.

17. The method of claim 15, further comprising recognizing an event signaling the client logging off of the server and maintaining a MAPI connection between the split proxy and the server.

18. The method of claim 15, further comprising exchanging over said MAPI connection between the split proxy and the server messages intended for the client and received at the server while the client is logged off from the server.

19. The method of claim 18, wherein exchanging comprises transferring from the server to the split proxy only those of the messages intended for the client that were received at the server since a last most recent transfer of messages from the server to the split proxy.

20. The method of claim 15, wherein the queuing structure is established on a per-client basis within a context of a session associated with the client on the split proxy.

21. The method of claim 15, wherein the MAPI messages are processed on a per-client basis within a context of a session associated with the client on the split proxy.

22. A method, comprising:
establishing a user session at a split proxy, which employs byte caching at each proxy of the split proxy, the user session associated with messaging application programming interface (MAPI) communications between a client and a server;

processing MAPI messages exchanged between the client and the server asynchronously within the session;

while the client is logged off from the server, fabricating, at the split proxy, one or more MAPI messages to the server to provoke responses from the server, wherein the one or more MAPI messages resemble messages which would otherwise be sent by the client if the client were logged on; and continuing the user session following the client logging off of the server by retrieving messages intended for the client from the server and storing the messages at a proxy of the split proxy.

23. The method of claim 22, further comprising delivering the messages to the client from the proxy.

24. A proxy, comprising a processor and non-transitory computer-readable medium storing instructions for executing by said processor, said instructions, when executed by said processor, causing said proxy to be configured to:

create message queues for exchanging messages with a corresponding proxy of a split proxy pair in support of messaging application programming interface (MAPI) communications, said messages making use of a byte cache maintained by said proxy;

set sockets associated with each queue to listen for asynchronous communications; and fabricate one or more MAPI messages that resemble messages which would otherwise be sent by a client if the client were logged on to provoke responses to said one or more MAPI messages; and receive, at a first one of the message queues, a message associated with a remote procedure call (RPC) from the client and process the message associated with the RPC according to whether or not the first message queue is empty.

25. The proxy of claim 24, wherein if the first message queue is empty, said instructions, when executed by said processor, cause said proxy to be configured to: process the message associated with the RPC immediately, and then transmit a corresponding message from the corresponding proxy.

26. The proxy of claim 25, wherein said instructions, when executed by said processor, cause said proxy to be configured to: receive a message responsive to the message corresponding to the message associated with the RPC, and, upon confirming said correspondence, transmit a message response to the message associated with the RPC.

27. The proxy of claim 24, wherein, if the first message queue is not empty, said instructions, when executed by said processor, cause said proxy to be configured to determine if the message associated with the RPC has an existing response stored at said proxy and, if so, transmit the response.

28. The proxy of claim 24, wherein, if the first message queue is not empty, said instructions, when executed by said processor, cause said proxy to be configured to determine if the message associated with the RPC has an existing response stored at said proxy and, if not, add the message associated with the RPC to the first message queue and transmit a corresponding message to the corresponding proxy.

29. The proxy of claim 24, wherein said instructions, when executed by said processor, cause said proxy to be configured to: receive, at the first one of the message queues, a message associated with a remote procedure call (RPC) and process the message according to whether or not an identifier in the message corresponds to an identifier of a previously stored message.

30. The proxy of claim 29, wherein said instructions, when executed by said processor, cause said proxy to be configured to: transmit an RPC response corresponding to the previously stored message if the identifier in the message corresponds to the identifier of the previously stored message.

31. The proxy of claim 29, wherein said instructions, when executed by said processor, cause said proxy to be configured to process the message associated with the RPC immediately and transmit a corresponding message to the corresponding proxy, if the identifier in the message does not correspond to any identifiers of previously stored messages.

32. The proxy of claim 24, wherein, if the first queue is not empty, said instructions, when executed by said processor, cause said proxy to be configured to queue the message associated with the RPC.

33. The method of proxy 24, wherein if the first queue is empty, then said instructions, when executed by said processor, cause said proxy to be configured to either queue the message associated with the RPC or transmit a corresponding RPC request, depending on whether or not another RPC request is identified as being outstanding.

34. The proxy of claim 24, wherein if the first queue is empty, and an RPC request is presently outstanding from said proxy, then said instructions, when executed by said processor, cause said proxy to be configured to either queue the message associated with the RPC or transmit a corresponding RPC request depending on a status of a context parameter of the message associated with the RPC.

35. The proxy of claim 24, wherein if the first queue is empty, then said instructions, when executed by said processor, cause said proxy to be configured to queue the message associated with the RPC at said proxy.

36. The proxy of claim 24, wherein if the first queue is not empty, and a corresponding RPC request was earlier received, then said instructions, when executed by said processor, cause said proxy to be configured to transfer an RPC response corresponding to the message associated with the RPC.

37. The proxy of claim 24, wherein if the first queue is not empty, but no corresponding RPC request was earlier received, then said instructions, when executed by said processor, cause said proxy to be configured to queue the message associated with the RPC.

* * * * *